United States Patent
Larson et al.

(10) Patent No.: US 7,597,447 B2
(45) Date of Patent: Oct. 6, 2009

(54) COLOR CORRECTING CONTRAST ENHANCEMENT OF DISPLAYS

(75) Inventors: Brent D. Larson, Cave Creek, AZ (US); Matthew B. Dubin, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 1169 days.

(21) Appl. No.: 10/891,715

(22) Filed: Jul. 14, 2004

(65) Prior Publication Data

US 2006/0012754 A1   Jan. 19, 2006

(51) Int. Cl.
*G03B 21/14* (2006.01)
(52) U.S. Cl. .......... 353/84; 359/443
(58) Field of Classification Search ............. 353/20, 353/84; 359/443–461
See application file for complete search history.

(56) References Cited

U.S. PATENT DOCUMENTS

| | | | |
|---|---|---|---|
| 4,354,739 A | | 10/1982 | Scanlon et al. |
| 5,037,196 A | * | 8/1991 | Takafuji et al. ............. 353/122 |
| 5,066,099 A | | 11/1991 | Yoshida et al. |
| 5,193,015 A | * | 3/1993 | Shanks ....................... 349/115 |
| 5,715,083 A | * | 2/1998 | Takayama .................. 359/443 |
| 6,428,169 B1 | * | 8/2002 | Deter et al. .................. 353/20 |
| 6,769,774 B2 | * | 8/2004 | McDowell ................... 353/84 |
| 6,847,483 B2 | * | 1/2005 | Lippey et al. ............... 359/443 |
| 7,040,764 B2 | * | 5/2006 | Przybyla et al. .............. 353/84 |
| 7,416,306 B2 | * | 8/2008 | Yamamoto et al. ............ 353/31 |
| 2004/0233524 A1 | * | 11/2004 | Lippey et al. ............... 359/443 |
| 2005/0030480 A1 | * | 2/2005 | Lippey et al. ................. 353/30 |
| 2005/0141084 A1 | * | 6/2005 | Waters ....................... 359/443 |
| 2006/0256292 A1 | * | 11/2006 | Lippey et al. ................. 353/29 |
| 2006/0279477 A1 | * | 12/2006 | Allen et al. .................... 345/30 |
| 2007/0081130 A1 | * | 4/2007 | May et al. ..................... 353/85 |
| 2007/0085977 A1 | * | 4/2007 | Fricke et al. .................. 353/79 |
| 2007/0206280 A1 | * | 9/2007 | May et al. ................... 359/443 |
| 2007/0296875 A1 | * | 12/2007 | Allen et al. ................. 348/743 |

FOREIGN PATENT DOCUMENTS

EP           1152286 A1    11/2001
WO       WO96/21883 A      7/1996

OTHER PUBLICATIONS

PCT International Search Report: PCT/US2005/024878, Applicant Reference No. H0006048.66722, Dec. 28, 2005, EP International Search Authority, 6 pages.

* cited by examiner

*Primary Examiner*—William C Dowling
(74) *Attorney, Agent, or Firm*—Ingrassia Fisher & Lorenz, P.C.

(57) ABSTRACT

Methods and apparatus are provided for color correction and contrast enhancement of projection displays. A visual display system includes a projector having a light source with a fixed spectral output, a display screen receiving the output of the projector and emitting a diffused output, and a color correction contrast enhancement filter positioned between the diffusing screen and a viewer. The filter differentially attenuates primary colors of the emission from the diffusing screen. The method includes projecting a light output from a light source having a fixed spectral output onto a diffusing screen, and attenuating primary colors of the emission from the diffusing screen with a light filter positioned adjacent to the diffusing screen.

18 Claims, 6 Drawing Sheets

COLOR CORRECTING CONTRAST ENHANCEMENT OF DISPLAYS

FIELD OF THE INVENTION

The present invention generally relates to spectrally balancing color displays, and more particularly relates to color correction and contrast enhancement of projection displays.

BACKGROUND OF THE INVENTION

Projection displays have numerous home and commercial applications. For example, rear-projection television displays are gaining market share for home use. Displays have also been important as information-conveying devices, such as those used in aircraft to provide terrain or flight information data. Ambient light may negatively impact images provided by the displays by decreasing contrast which generally results in a less ear image. The impact of ambient light is more significant in display applications where acquisition of information from the display is particularly important. For example, avionics displays provide a visual indication of in-bound terrain, aircraft status, or other flight information particularly for real-time decision-making, and ambient light may diminish the visual presentation of avionics displays.

Rear projection displays generally have a reduced contrast when used with bright ambient light. This is generally due to the backscatter of a portion of the ambient light by rear projection screens. One common approach to offset the impact of ambient light on displays is to increase the brightness of the projection display which generally increases the brightness of the image while the brightness of the backscattered light remains unchanged. This approach generally increases a contrast ratio of the image where the contrast ratio is a ratio of the highest possible luminance of the image to the lowest possible luminance of the image. The luminance includes any contributions from ambient light. In general, this approach is typically limited by the available brightness of the display. For applications where the display is to be viewed in bright sunlight, it is often difficult or not practical to build a display that is sufficiently bright.

Another approach is to use a neutral density filter in front of the display screen. The neutral density filter is generally not wavelength specific and typically attenuates light across the visual spectrum. Ambient light passes through the filter when traveling towards the screen and passes through the filter when reflected from the screen towards a viewer. The net effect of this neutral density filter is to attenuate the ambient light more than the light from image. When this is done, the contrast ratio of the display is improved, although generally at an overall loss of luminance. A further approach is to use a circular polarizer to improve contrast over the full spectral range of the display. This approach can be effective for many surfaces that reflect with appropriate polarization properties but may also have a significant impact on light throughput from the projector.

Another approach to improving the contrast ratio of the display is to use out-of-band contrast enhancement filters. These filters have been used in the past with displays that have narrow, in-band wavelength regions. The spectral regions that contain the desired image data at the correct wavelength are the in-band wavelength regions. These in-band regions typically correspond to independently modulated colors that are used to generate a color gamut of the display. These colors are referred to as the primary colors for the display, but more than one in-band region may be in a given primary color. Often these primary colors correspond to red, green, and blue. It is also possible to have two or more than three primary colors that do not include red, green, or blue. The spectral regions that do not contain significant amounts of the desired light are referred to as the out-of-band wavelength regions. Light that is present in these out-of-band regions tends to desaturate the primary colors. Removing light from the out-of-band wavelengths, for example in the yellow regions of the visible spectrum, will often increase the saturation of the primary colors and increase the color gamut of the display.

Cathode ray tubes (CRTs) are one example of a display with well defined in-band and out-of-band regions. Because these displays have significantly wide out-of-band regions, selectively absorbing such bands does not generally result in a significant display brightness penalty but does provide a contrast ratio improvement. For example, if a filter absorbs all of the out-of-band light between the red and green primary colors, the red and green primaries are not changed, but the ambient light is reduced. When implementing this approach, substantial efforts are typically made to minimize any absorption of the in-band wavelengths while maximizing the absorption in the out-of-band regions. Rare earth glasses have been used extensively for creating out-of-band absorbing contrast enhancement filters.

Further complicating projection display performance, limited types of light sources are available for projection displays. Such light sources are generally not sufficiently spectrally balanced, particularly for avionics displays, and are classified a having fixed spectral output. A fixed spectral output refers to a lack of independent adjustment at the source of the relative amount of light in different color bands. The inherent spectral distribution associated with these sources may possibly be changed but generally can not be changed after the source is manufactured. Typically after the source is manufactured, change to the spectral distribution is accomplished by altering the total light output otherwise the range of achievable change is substantially small. Arc lamps and single die white light emitting diodes (LEDs) are example of these types of sources. Short arc, high intensity discharge lamps, such as Mercury and Xenon lamps, are commonly used in projection displays, and these lamps generally have a fixed spectral distribution. For many applications, the chromaticity limitations of the displays may be tolerated. However, where a specific color requirement is needed for the display, these types of lamps may not be suitable. For example, Mercury lamps tend to be deficient in red light while providing ample blue and green light.

One approach to this problem is to configure the projection display to be more efficient for the deficient wavelength band. For example, for a red light deficient light source, the pathway for red light may be separated and optimized independently from the pathway for a cyan light. In this example, the efficiency of the cyan path is deliberately decreased with respect to the red path in order to obtain the desired color requirement. Implementation of this approach may be made through adjusting amplitudes of the deficient light bands to compensate for the variations such as by adjusting beam currents in a CRT. These reductions in efficiency due to chromaticity adjustment and ambient contrast enhancement may be problematic in applications such as avionics displays, where more stringent requirements are often placed on luminance, power, and other related requirements as well.

Accordingly, it is desirable to provide high ambient contrast enhancement of projection displays. In addition, it is desirable to provide color correction and contrast enhancement of projection displays having light sources providing a fixed spectral output, and to accomplish this with minimal impact to the optical efficiency. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus and method are provided for color correction and contrast enhancement of projection displays. In one exemplary embodiment, a visual display system includes a light source having a fixed spectral output, a display screen having a viewing surface, and a contrast enhancement filter positioned adjacent said viewing surface of said display screen. The display screen is configured to receive the fixed spectral output of the light source and further configured to emit a plurality of primary colors from the viewing surface. The filter is configured to receive the plurality of primary colors and further configured to attenuate a first primary color of the plurality of primary colors more than a second primary color of the plurality of primary colors.

In another exemplary embodiment, a light balancing system includes a projector configured to project an image having a plurality of primary color bands, a lamp having a fixed spectral output, a diffusing screen configured to receive the image from the projector and further configured to emit a diffused image having a plurality of primary color bands, and a filter positioned adjacent the diffusing screen. The lamp is configured to illuminate the projector with the fixed spectral output. The filter is configured to receive the diffused image and further configured to differentially attenuate the plurality of primary color bands of the diffused image.

A method is provided for color correction and contrast enhancement of projection displays. The method includes determining spectral deficiencies of a fixed spectral light output, emitting an image with the fixed spectral light output, the image having a plurality of primary color bands, and differentially attenuating the plurality of primary color bands of the image based on the determined spectral deficiencies.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

According to various exemplary embodiments, a display system includes a color correction contrast enhancement filter to provide contrast enhancement of displayed images particularly useful in high ambient light conditions. The filter is preferably located at an image output of the display system, such as a display screen or diffusing screen. The display system may include a variety of displays including but not limited to rear projection displays, front projection displays, and other conventional image displays. Although the display system is described hereinbelow with respect to projection displays for convenience of explanation, a variety of displays may be used in the display system including displays incorporating cathode ray tubes (CRTs), organic light emitting diodes (OLEDs), and liquid crystal displays (LCDs).

Figure 1:
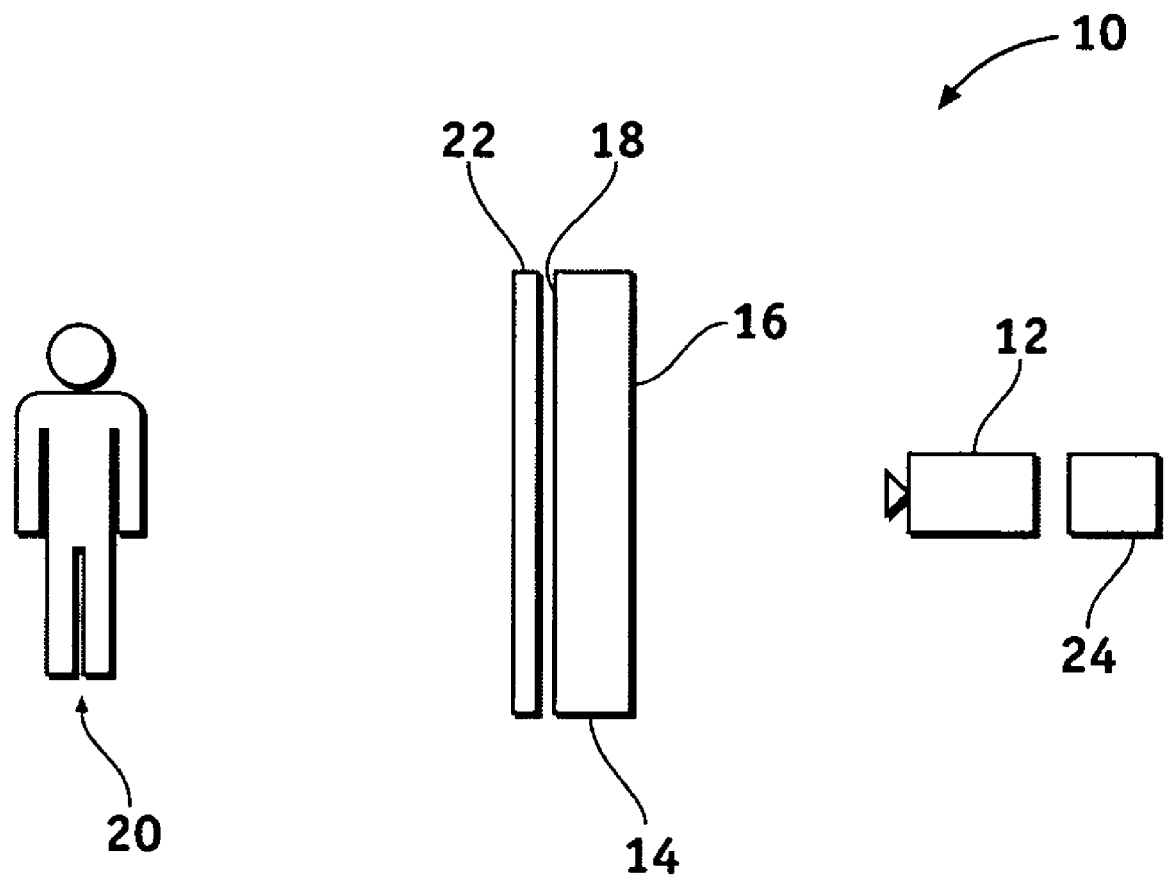
FIG. 1 is a schematic diagram showing an exemplary embodiment of a rear projection display system.

Referring to the drawings, FIG. 1 is a schematic diagram showing an exemplary embodiment of a rear projection display system 10. The rear projection display system 10 includes a projector 12 with a light source 24, such as a conventional lamp, a display screen 14 or diffusing screen that receives light or images from the projector 12, and a filter 22 positioned adjacent to the diffusing screen 14 that selectively corrects color and enhances contrast of a final image seen by a viewer, shown generally at 20.

The display system 10, or display, may include any display element suitable for displaying various symbols and information conventionally shown in avionics displays. Many currently known monitors are suitable for this task, including various CRT and flat-panel display systems. The display system 10 may be based on a panel mounted display, a HUD projection, or any known technology. The display system 10 suitably includes various graphical elements associated with the environment of an aircraft including the location of various navigational aids including VHF Omnirange stations, non-directional beacons, radio stations, and the like, and airports, airways, special use airspace, and other aircraft.

The light source 24 provides illumination for the projector 12 and generally has a substantially fixed spectral output. The term "fixed spectral output" is defined herein as a light output with spectral characteristics that are not independently adjustable by a user. For example, while it may be possible to adjust the light intensity of the light source 24, the spectral characteristics of the light from the light source 24 is can not be manually varied. The light source 24 may be a conventional lamp (not shown), an illumination system including one or more conventional lamps, or any other light-generating device or system. Examples of lamps include a variety of arc lamps, such as short arc high intensity lamps including Mercury lamps and Xenon lamps, fluorescent lamps, light emitting diodes, and other conventional lamps used for projection.

The projector 12 includes conventional optics for creating an image and relaying the image onto the diffusing screen 14. For example, the projector 12 may include a lens system or array (not shown) that manipulates the image, such as by minimizing optical aberrations, for projection of the image onto the screen 14. Although the light source 24 is described as being separate from the projector 12, the relationship of the light source 24 with the projector 12 is not critical to the invention. For example, the light source 24 may be incorporated with the projector 12.

The color correcting contrast enhancement filter 22 is located adjacent to the diffusing screen such that the diffusing screen 14 is between the projector 12 and the filter 22. For example, the filter 22 may be affixed onto the diffusing screen 14 to cover a viewing area provided by the screen 14. In this embodiment, the diffusing screen 14 has a front surface 18 and a rear surface 16, and the filter 22 is affixed to the front surface 18 such that the filter 22 is between the viewer 20 and the diffusing screen 14. The filter 22 can be affixed to the diffusing screen 14 with any appropriate material filling the space therebetween. Examples of suitable materials filling such space include, by way of example and not of limitation, air, optical epoxy, plastic, adhesive, and glass. The light or image from the projector 12 is directed at the rear surface 16 of the diffusing screen 14, and the light or image emerges from the front surface 18 and passes through the filter 22.

Based on pre-determined spectral characteristics of the light emerging from the light source 24 or the light or image projected by the projector 12 or the light or image received by the diffusing screen 14, the filter may be customized to have optical properties that correct color imbalance while enhancing contrast. The filter 22 has optical properties to differentially attenuate the primary color bands of the display, meaning that the filter 22 selectively attenuates different primary colors of the image emerging from the diffusing screen 14 in substantially different amounts. The term "primary color" is defined herein as a wavelength band associated with the primary additive colors used in a display, such as red, green, and blue.

Depending on the spectral characteristics of the light or image projected onto the diffusing screen 14, or alternatively on the spectral characteristics of the light or image emerging from the diffusing screen 14, the degree of attenuation associated with the filter for each primary color may vary. Because the filter 22 attenuates the primary colors in different amounts, the color of an observed image may be shifted to a desired point. This may be generally done without using any of the dynamic range of the display system 10 to attenuate the primary colors while preserving the intrinsic modulation capability of the display system 10 for imagery. In addition, placing the filter 22 between the diffusing screen 14 and the viewer 20 increases the bright ambient contrast of the system 10. This exemplary embodiment allows adjustment of the display's color and improvement to the bright ambient contrast by removing light with a single light removing element. This exemplary embodiment also is a more efficient system when compared to a system where color shift and contrast enhancement are accomplished using separate light removal elements.

Figure 2:
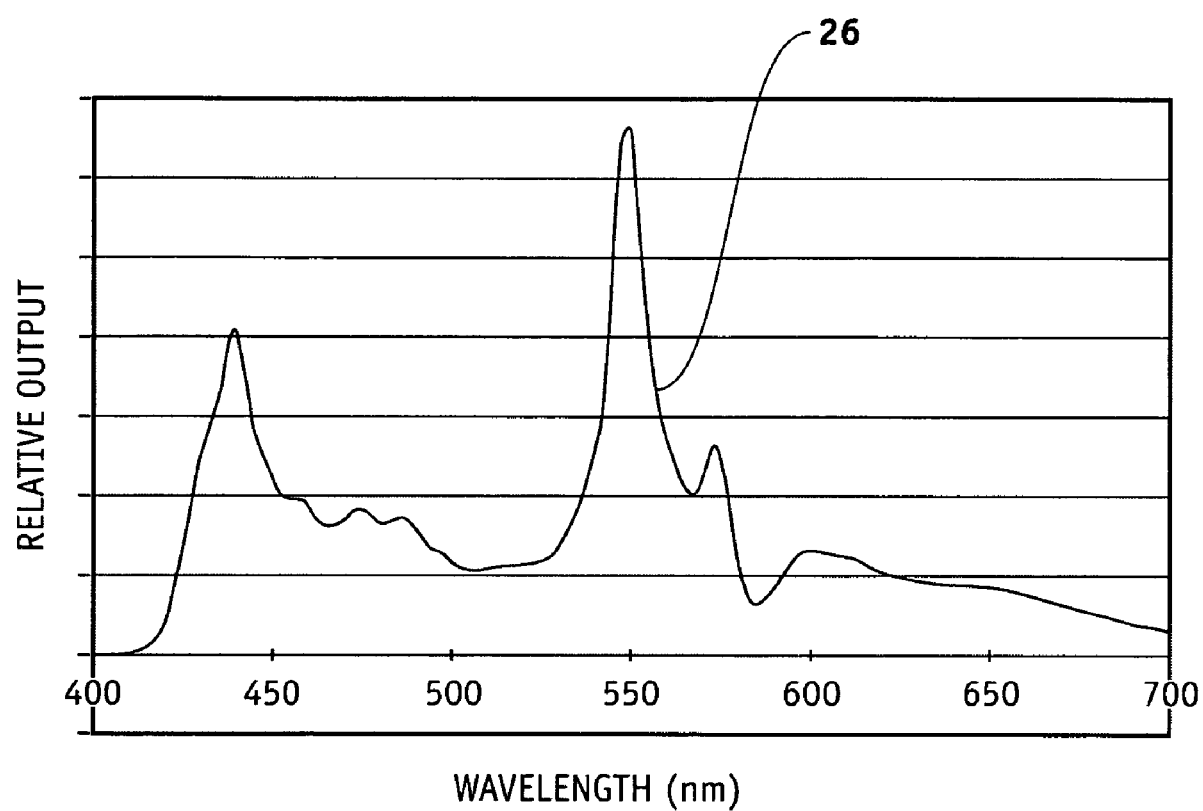
FIG. 2 is a graph showing a exemplary embodiment of a white spectral output distribution from a projector.

FIG. 2 is a graph showing an exemplary embodiment of a white spectral output distribution 26 from a projector, such as the projector 12 shown in FIG. 1, that incorporates an arc lamp illuminator having a fixed spectral output, such as the light source 24 shown in FIG. 1. Those of skill in the art will appreciate that the projector output has more energy in the blue primary color and green primary color regions than in the red primary color region, as best shown in FIG. 2. In one exemplary embodiment, the primary color bands of the light projected onto the diffusing screen 14 are attenuated to balance the spectral intensities of red, green, and blue in relation to one another. When a more neutral white is desirable, for example a white that is visually similar to a spectrally flat source, the light source 24 generates a light output characterized by a deficient red wavelength band, an over-compensated green wavelength band, and an over-compensated blue wavelength band.

Figure 3:
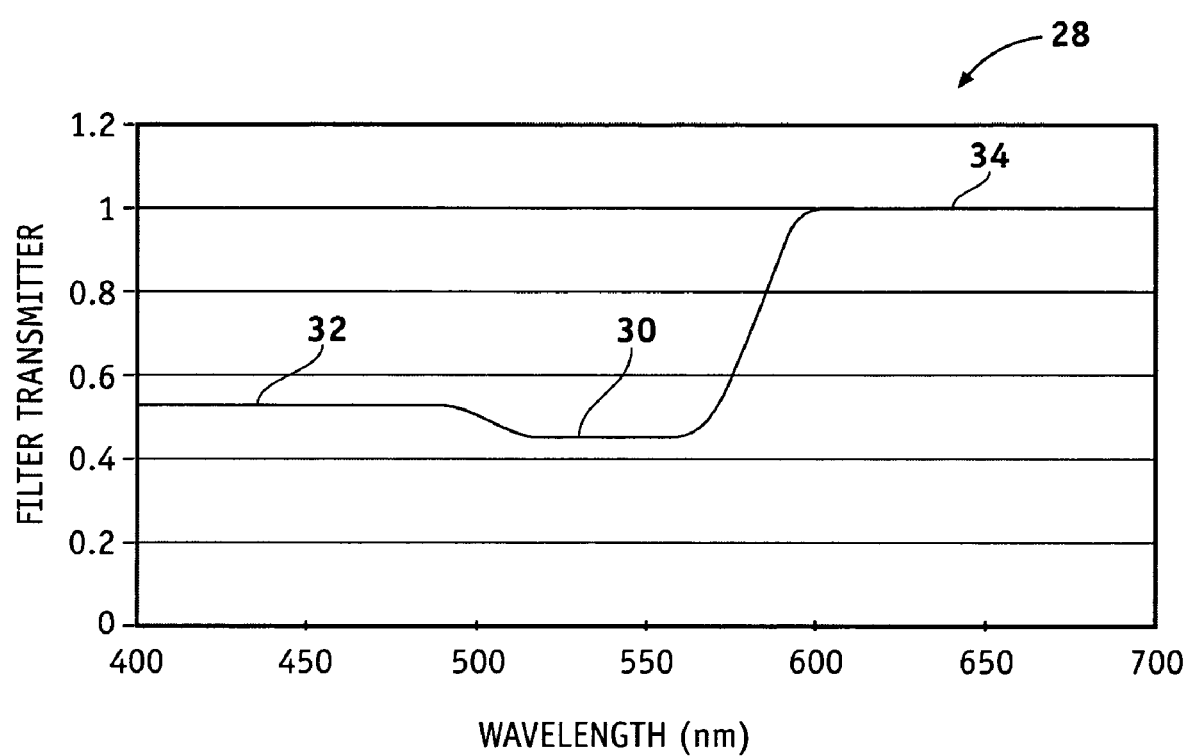
FIG. 3 is a graph showing an exemplary embodiment of a filter spectrum.

FIG. 3 is a graph showing an exemplary embodiment of a filter spectrum 28 for the filter 22 with an attenuation level 30 for an over-compensated green wavelength band and an attenuation level 32 for an over-compensated blue wavelength band while passing a deficient red wavelength band 34 such that the primary colors are substantially balanced and have substantially equal energy in each primary color. Introduction of this filter 22 reduces the luminous output of the projector used to produce the white spectral output distribution 26 shown in FIG. 2. For example, in one exemplary embodiment, the filter 22 having the filter spectrum 28 reduces the luminous output of the projector 12 by a factor of about 28 percent to meet a desired chromaticity. This reduction is without consideration of modification or supplementation of the source spectrum itself.

In this exemplary embodiment, by placing the filter 22 down-stream from the diffusing screen 14 as previously discussed hereinabove, the reflectance of the display 10 to ambient light has been reduced by about 44 percent in comparison to a reduction in reflectance of the display to ambient light when color correction is implemented in the projector 12. The introduction of the filter 22 down-stream from the diffusing screen 14 improves high ambient contrast of the image displayed on the diffusing screen 14 and viewed by the viewer 20. The filter spectrum 28 shown in FIG. 3 is merely exemplary, and one skilled in the art will appreciate that many similar spectra may achieve similar color balancing based upon standard methods for computing color coordinates. The filter spectrum preferably differentially attenuates the primary colors in a way that corrects an inherent chromatic imbalance of the light source. The filter spectrum of the filter 22 provides contrast enhancement for displays with light sources having a fixed spectral output.

As best shown in FIG. 3, the filter spectrum 28 has a lowest transmittance for the green primary color. Those of skill in the art will appreciate that the lowest transmittance of the filter spectrum may be a different primary color based on the color imbalance of the spectral output distribution for a particular projector or light source. While the greatest benefit to reflectance is achieved by attenuating the green primary color band, moving attenuation from behind the diffusing screen 14 to the front is generally beneficial. A differential attenuation factor, defined as a ratio of an average transmittance for a first primary color divided by an average transmittance for a second primary color, is illustrated in FIG. 3 to be as high as about 2 or more. In one exemplary embodiment, the differential attenuation factor for rear projection is preferably greater than about 1.2 for contrast enhancement and color correction, and more preferably greater than about 1.5 provided the filtering is in line with spectral requirements for the display output.

In another exemplary embodiment, an additional contrast enhancement filter(s) may be incorporated with the filter 22, such as positioned adjacent to the filter 22. Examples of additional contrast enhancement filters include but are not limited to neutral density filters, out-of-band contrast enhancement filters, or other conventional contrast enhancement approaches. The filter 22 may be a separate component with any of a number of optical media between the filter 22 and the additional conventional contrast enhancement filter (s). Alternatively, the combination of the filter 22 with any additional conventional contrast enhancement filter(s) may be formed as a single component. Examples of this combination include, but are not limited to, adding colored dyes to a neutral density filter, and adding a dopant to a rare earth glass that attenuates each of the primary colors differently.

Figure 4:
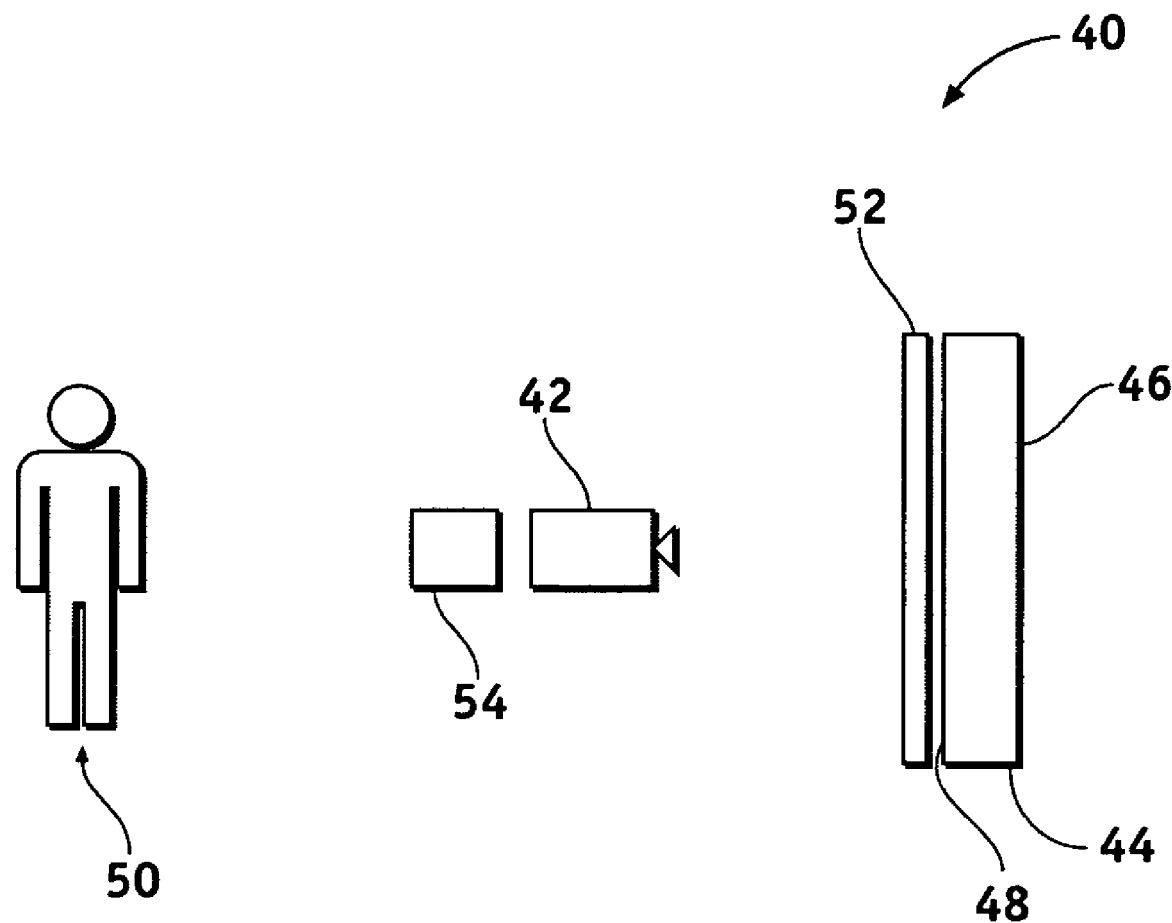
FIG. 4 is a schematic diagram showing an exemplary embodiment of a front projection display system.

FIG. 4 is a schematic diagram showing an exemplary embodiment of a front projection display system, shown generally at 40. The front projection display system 40 includes a projector 42 with a light source 54, such as the aforementioned conventional lamp, a display screen 44, or diffusing screen, receiving light or images from the projector 42, and a filter 52 positioned adjacent to the diffusing screen 44 that selectively corrects color and enhances contrast of a final image seen by a viewer, shown generally at 50. In this embodiment, the filter 52 is positioned between the projector 42 and the diffusing screen 44 as well as being positioned between the viewer 50 and the diffusing screen 44.

The light source 54 provides illumination for the projector 42 and generally has a substantially fixed spectral output. For example, the spectral characteristics of the light from the light source 54 are not adjustable although the light source 54 may be provided with variable light output control such as for overall intensity or luminance. In some cases, even the control of intensity of the light source 54 is significantly limited. The light source 54 may be a conventional lamp (not shown), an illumination system including one or more conventional lamps, or any other light-generating device or system.

The projector 42 includes conventional optics for creating an image and magnifying the light or image provided by the light source 54 onto the diffusing screen 44. For example, the projector 42 may include a lens system or array (not shown) that manipulates the image, such as by minimizing optical aberrations, for projection of the image onto the screen 44. Although the light source 54 is described as being separate from the projector 42, the relationship of the light source 54 with the projector 42 is not critical to the invention. For example, the light source 54 may be incorporated with the projector 42.

The color correcting contrast enhancement filter 52 is located adjacent to the diffusing screen 44 such that the filter 52 is between the projector 42 and the screen 44. For example, the filter 52 may be affixed onto the diffusing screen 44 to cover a viewing area provided by the screen 44. In this embodiment, the diffusing screen 44 has a front surface 48 and a rear surface 46, and the filter 52 is affixed to the front surface 48 such that the filter 52 is between the viewer 50 and the diffusing screen 14. The filter 52 may be affixed to the diffusing screen 44 with any appropriate material filling a space therebetween. Examples of suitable materials include, but are not limited to air, optical epoxy, plastic, adhesive, or glass. In another exemplary embodiment, the spectrally selective absorbing material of the filter 52 may be incorporated in the diffusing material of the screen 44. The light or image from the projector 42 is directed at the front surface 48 of the diffusing screen 44 and passes through the filter 52 in transit to the diffusing screen 44. The light or image is then substantially reflected off of the diffusing screen 44 and passes through the filter 52 as the light travels in a general direction back towards the viewer 50.

Based on pre-determined spectral characteristics of the light emerging from the light source 54 or the light or image projected by the projector 42 or the light or image received by the diffusing screen 44, the filter 52 may be customized to have optical properties that correct color imbalance while maintaining contrast. The filter 52 has optical properties to selectively attenuate at least one or the primary colors of the image emerging from the diffusing screen 44 more than at least one other primary color. Depending on the spectral characteristics of the light or image projected onto the diffusing screen 44, or alternatively on the spectral characteristics of the light or image emerging from the diffusing screen 44, the degree of attenuation associated with the filter for each primary color may vary. In this embodiment, the optical properties of the filter 52 account for the in-bound path of light passing through the filter 52 to the screen 44 and the outbound path of the light passing through the filter 52 to the viewer 50. Using the filter 52, manual variation of output from the light source or from a display incorporating the light source, such as by increasing the red, green, or blue intensity or gain, may become unnecessary for color correction and contrast enhancement.

With the aforementioned exemplary embodiment, the color of the display may be adjusted while minimizing any negative impact on the bright ambient contrast. Using a conventional approach for removing unnecessary light associated with color imbalance, such as from decreased efficiency in one of the primary color paths internal to the projector 42, the brightness of the image would likely decrease but the brightness of the ambient light would not decrease. The conventional approach would cause the bright ambient contrast ratio of the image to decrease. Using the exemplary embodiment, the light from the projector 42 would pass through the filter 52 twice. These passes would adjust the primary colors in a desirable way. In addition, ambient light would also pass through the filter 52 twice such that the ambient light is reduced in a similar manner as the image light is reduced. Because the reduction in brightness is determined as the brightness of the light multiplied by the transmission of the filter 52, both the image and the ambient are multiplied by the same amount such that the contrast ratio remains unchanged.

In one embodiment, the primary colors of the light projected onto the diffusing screen 44 are attenuated to balance the spectral intensities of red, green, and blue in relation to one another. For example, if the light source 54 generates a light output characterized by a deficient green wavelength band, an over-compensated red wavelength band, and an over-compensated blue wavelength band, the filter 52 attenuates the over-compensated red wavelength band and blue wavelength band while passing the deficient green wavelength band such that the primary colors are substantially balanced. Placing the filter 52 down-stream from the light source 54 maintains ambient contrast of the image displayed on the diffusing screen 44 and viewed by the viewer 50.

Figure 5:
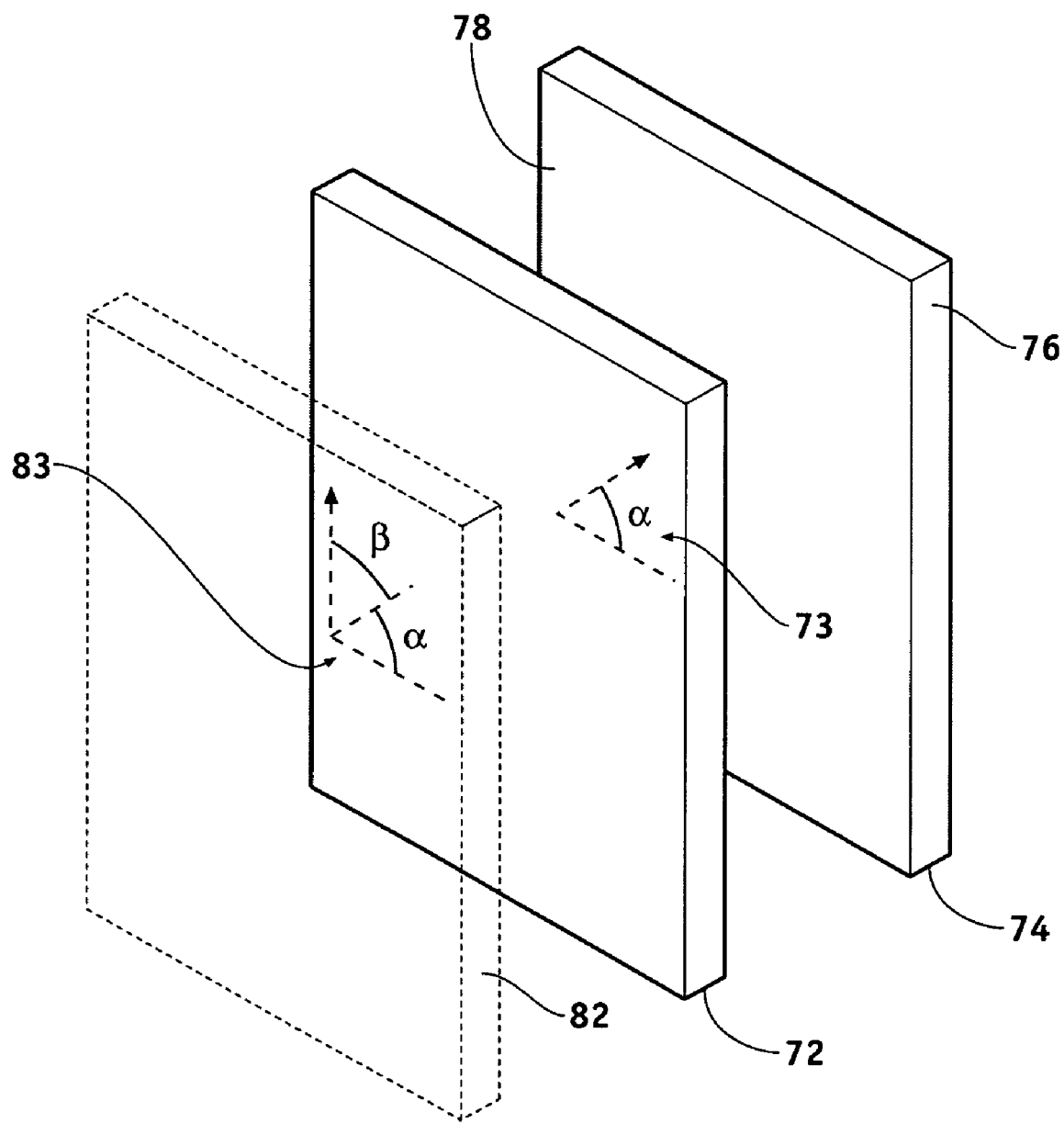
FIG. 5 is a schematic diagram showing an exemplary embodiment of a filter configuration.

FIG. 5 is a schematic diagram showing an exemplary embodiment of a filter 72 and diffusing screen 74. In the previous embodiments, the color correcting contrast enhancement filters are described as attenuators, such as might be fabricated using colored dyes, pigments, or other colorants contained in or on a substrate or other material structure. In the embodiment shown in FIG. 5, the diffusing screen 74 includes a rear surface 76 and a front surface 78, and the filter 72 is a colored polarizer. The filter 72 polarizes a first set of wavelengths and is substantially non-polarizing for a second set of wavelengths or substantially transparent to the second set of wavelengths. For example, using the spectra described with respect to FIGS. 2 and 3, a red polarizer would substantially modify the color of the display to approximate the desired neutral color. This effect is substantially similar to the desired filter spectrum 72 shown in FIG. 3.

The filter 72 may also be a linear polarizer or a circular polarizer, depending on an arrangement and characteristics of the other components of the display. In many cases, such as in the case of a totally depolarizing diffusion screen, e.g., both transmission and reflection, either linear polarizer or circular polarizer may be used. For polarization preserving screens and polarized illumination, the polarizer type and an orientation 73 of the filter 72 may be adjusted to most closely yield the desired chromaticity. For example, the orientation 73 of the filter 72 may be adjusted by an angle $\alpha$. In the case of a rear projection screen for which circular polarizer contrast enhancement is particularly effective, a colored circular polarizer may be used. For many diffusing screen types, the use of a circular polarization may further minimize the reflectance in the polarizing wavelength region.

An optional second polarizer 82 having an orientation angle 83 relative to the orientation of the filter 72 is shown in FIG. 5. The second polarizer may be adjusted by an angle $\beta$. In one exemplary embodiment, the second polarizer 82 is a neutral or broadband film polarizer. This exemplary embodiment is particularly beneficial in the case of a polarized projector and either a front projection screen or a polarization preserving rear projection screen. The second polarizer 82 may be aligned to match the polarization of the projector, and the angle β between the second polarizer 82 orientation 83 and the orientation 73 of the filter 72 may be aligned to attenuate the corresponding primary colors as needed to achieve the desired white chromaticity. Other modifications may be made to the embodiment shown in FIG. 5 including adding retarders to aid polarization control, switching the relative position of the filter 72 and the second polarizer 82, and including additional colored polarizers to achieve the desired color correction.

Figure 6:
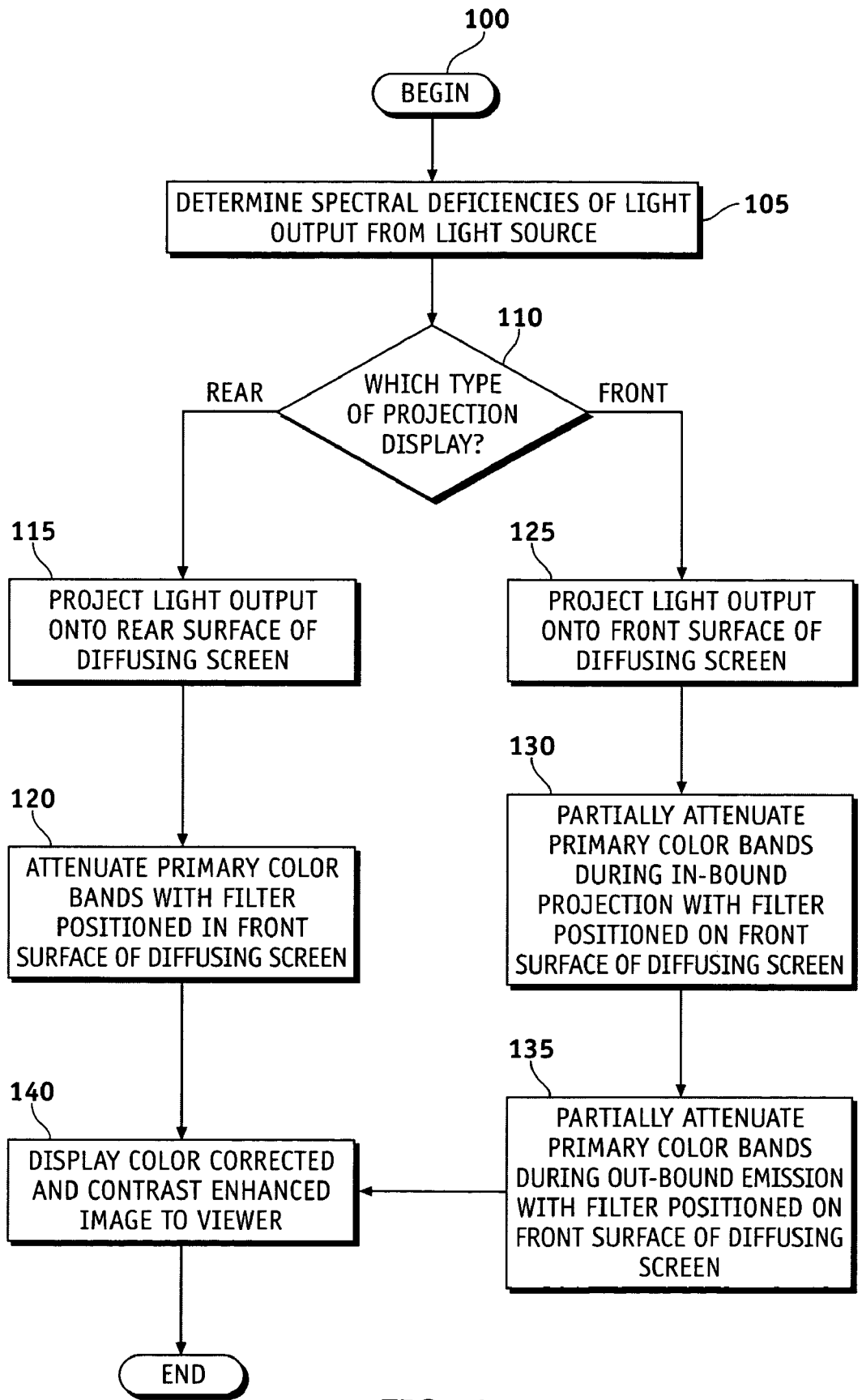
FIG. 6 is a flow chart of an exemplary method of color correction and contrast enhancement for projection displays.

FIG. 6 is a flow chart of an exemplary method of color correction and contrast enhancement. The method begins at 100. Spectral deficiencies associated with a light output from a light source may be pre-determined at 105 and used to select and/or construct a filter with optical properties that correct any determined color imbalance of the light source and enhance contrast of the resulting image on the display screen. Alternatively, the spectral deficiencies of the projector and/or light source may be separately determined, for example, with a conventional spectrum analyzer. Determining the spectral deficiencies of the light source may include an analysis of the red, green, and blue wavelength components of the light output. For example, a determination is made as to which of the red, green, and blue primary colors are over-emphasized (e.g., greater luminance) or under-emphasized (e.g., lesser luminance) with respect to one another in the light output.

The type of projection display may be determined at 110. Information regarding the type of projection display may also be used to select and/or construct the filter 22 (FIG. 1), 52 (FIG. 4). For example, with the rear projection display embodiment shown in FIG. 1, the filter 22 accounts for single pass images displayed on the diffusing screen 14. With the front projection display embodiment shown in FIG. 4, the filter 54 accounts for double pass images, as previously mentioned hereinabove. Depending on whether the projection display is a front projection display or a rear projection display, the light output is filtered differently. In many cases, the single pass filter embodiment may be constructed from a double pass filter by using two double pass filters in series or by doubling the thickness of the double pass filter, for example.

In a rear projection display embodiment, the light output from the light source 24 (FIG. 1) having a fixed spectral output is projected onto the rear surface 16 (FIG. 1) of the diffusing screen 14 (FIG. 1) at 115 by the projector 12 (FIG. 1). The light emerging from the front surface 18 (FIG. 1) of the diffusing screen 14 (FIG. 1) is selectively attenuated by the filter 22 (FIG. 1) at 120. The filter 22 (FIG. 1) attenuates one of the primary colors more than one other primary color to correct imbalances of the light source 24 (FIG. 1). For example, the filter 22 (FIG. 1) attenuates over-emphasized color primary peaks while passing all other wavelengths.

In a front projection display embodiment, the light output from the light source 54 (FIG. 4) having a fixed spectral output is projected through the filter 52 (FIG. 4) and onto the front surface 48 (FIG. 4) of the diffusing screen 44 (FIG. 4) at 125 by the projector 42 (FIG. 4). In this first pass, the filter 52 (FIG. 4) partially attenuates color primary peaks to partially correct imbalances of the light source 54 (FIG. 4) at 130. For example, the filter 52 (FIG. 4) partially attenuates over-emphasized color primary peaks while passing all other wavelengths. The once-filtered light reflects off of the diffusing screen 44 (FIG. 4) and makes a second pass through the filter 52 (FIG. 4). In this second pass, the filter 52 (FIG. 4) partially attenuates the previously partially attenuated color primary peaks to complete color correction of the light source 54 (FIG. 4) at 135.

In both front projection display and rear projection display embodiments, the primary colors of the emission from the diffusing screen are selectively attenuated with the filter positioned adjacent to the diffusing screen to correct color imbalance of the light output from the light source. This attenuation depends on the spectral characteristics of the light source. The particular wavelength band or wavelength bands attenuated by the filter may be customized for different types of light sources. For example, if a Mercury lamp were used as the light source, the filter may attenuate the red wavelength band less because Mercury lamps are commonly deficient in red light. In another example, if single die, white LEDs were used as the light source, the filter may attenuate the blue wavelength band more because single die, white LEDs are commonly bluish in color. The final color corrected contrast enhanced image is displayed to the viewer at 140.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A visual display system comprising:
  a light source having a fixed spectral output and specific spectral deficiencies;
  a display screen having a viewing surface, said display screen configured to receive said fixed spectral output of said light source and further configured to emit a plurality of primary colors from said viewing surface; and
  a colored polarizer positioned adjacent said viewing surface of said display screen, said colored polarizer configured to receive said plurality of primary colors and further configured to attenuate a first primary color of said plurality of primary colors more than a second primary color of said plurality of primary colors, based on the specific spectral deficiencies.

2. A visual display system according to claim 1, wherein said display screen comprises a rear surface opposing said viewing surface, said rear surface configured to receive said fixed spectral output; and wherein said filter is affixed to said viewing surface of said display screen.

3. A visual display system according to claim 2, wherein said rear surface of said display screen is configured to receive said fixed spectral output of said light source.

4. A visual display system according to claim 2, wherein said contrast enhancement filter is configured to receive said plurality of primary colors of said display screen.

5. A visual display system according to claim 1, wherein said plurality of primary colors comprises a red primary color, a green primary color, and a blue primary color; and
  wherein said filter is configured to attenuate at least one primary color selected from said red primary color, said green primary color, and said blue primary color.

6. A visual display system according to claim 1 further comprising at least one optical element positioned adjacent said filter, said at least one optical element selected from a neutral filter, a rare earth filter, and a neutral polarizer.

7. A light balancing system comprising:
- a projector configured to project an image having a plurality of primary color bands;
- a lamp having a fixed spectral output containing specific spectral deficiencies, said lamp configured to illuminate said projector with said fixed spectral output;
- a diffusing screen configured to receive said image from said projector said diffusing screen comprising a viewing surface configured to emit said diffused image having a plurality of primary color bands, and;
- a filter affixed to said viewing surface of said diffusing screen, said filter being configured to receive said diffused image and further configured to differentially attenuate said plurality of primary color bands of said diffused image in order to correct the specific spectral deficiencies.

8. A light balancing system according to claim 7, wherein said filter is configured to:
- receive said image projected from said projector;
- partially and differentially attenuate said plurality of primary color bands of said image projected from said projector; and
- partially and differentially attenuate said plurality of primary color bands of said diffused image emitted from said viewing surface of said diffusing screen.

9. A light balancing system according to claim 7, wherein said filter is positioned between said projector and said diffusing screen.

10. A light balancing system according to claim 7, wherein said diffusing screen is positioned between said projector and said filter.

11. A light balancing system according to claim 7, wherein said fixed spectral output comprises a red primary color band, a green primary color band, and a blue primary color band; and
- wherein said filter is configured to partially attenuate at least one primary color band selected from said red primary color band, said green primary color band, and said blue primary color.

12. A light balancing system according to claim 7 further comprising at least one optical element selected from a neutral filter, a rare earth filter, and a neutral polarizer, said at least one optical element positioned adjacent said filter.

13. A method of color correction and contrast enhancement comprising the steps of:
- determining spectral deficiencies of a fixed spectral light output;
- emitting an image with the fixed spectral light output, the image having a plurality of primary color bands; and
- differentially attenuating the plurality of primary color bands of the image based on the determined spectral deficiencies.

14. A method according to claim 13, wherein said differentially attenuating step comprises the steps of:
- attenuating a first primary color band of the plurality of color bands; and
- attenuating a second primary color band of the plurality of color bands more than said first primary color band attenuating step.

15. A method according to claim 13, wherein said image emitting step comprises the steps of:
- illuminating the image onto a rear surface of a diffusing screen; and
- projecting the image from the diffusing screen.

16. A method according to claim 13, wherein said image emitting step comprises the steps of:
- illuminating the image onto a viewing surface of a diffusing screen; and
- projecting the image from the viewing surface of the diffusing screen.

17. A method according to claim 16, wherein said differentially attenuating step comprises the steps of:
- partially attenuating primary color bands of the image during said illuminating step; and partially attenuating primary color bands of the image during said projecting step.

18. A method according to claim 13, wherein said differentially attenuating step comprises the step of partially attenuating at least one primary color band selected from a red primary color band, a green primary color band, and a blue primary color band.

* * * * *

UNITED STATES PATENT AND TRADEMARK OFFICE
CERTIFICATE OF CORRECTION

PATENT NO. : 7,597,447 B2  
APPLICATION NO. : 10/891715  
DATED : October 6, 2009  
INVENTOR(S) : Larson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1483 days.

Signed and Sealed this

Twenty-eighth Day of September, 2010

David J. Kappos  
*Director of the United States Patent and Trademark Office*